(12) United States Patent
Park et al.

(10) Patent No.: US 11,570,954 B2
(45) Date of Patent: Feb. 7, 2023

(54) ROCKET FOR ARTIFICIAL RAINFALL USING EJECTION HYGROSCOPIC FLARE

(71) Applicant: National Institute of Meteorological Sciences, Seogwipo-si (KR)

(72) Inventors: Ji Man Park, Seogwipo-si (KR); Woon Seon Jung, Seogwipo-si (KR); Joo Wan Cha, Seogwipo-si (KR); Soo Jong Kim, Sejong (KR); Kyoung Jin Woo, Sejong (KR); Sung Hoon Ryu, Sejong (KR)

(73) Assignee: National Institute of Meteorological Sciences, Seogwipo-si (KR)

( * ) Notice: Subject to any disclaimer, the term of this patent is extended or adjusted under 35 U.S.C. 154(b) by 358 days.

(21) Appl. No.: 17/075,861

(22) Filed: Oct. 21, 2020

(65) Prior Publication Data
US 2022/0065599 A1  Mar. 3, 2022

(30) Foreign Application Priority Data
Aug. 28, 2020 (KR) .......... 10-2020-0109379

(51) Int. Cl.
*A01G 15/00* (2006.01)
*F42B 10/56* (2006.01)
(Continued)

(52) U.S. Cl.
CPC .......... *A01G 15/00* (2013.01); *F42B 4/12* (2013.01); *F42B 10/56* (2013.01); *F42B 12/46* (2013.01); *F42B 12/50* (2013.01); *F42B 15/10* (2013.01)

(58) Field of Classification Search
CPC ... A01G 15/00; F42B 4/06; F42B 4/10; F42B 4/12; F42B 4/28; F42B 10/56;
(Continued)

(56) References Cited

U.S. PATENT DOCUMENTS

| 3,785,557 A | * | 1/1974 | Womack | ................ | A01G 15/00 102/357 |
| 5,357,865 A | * | 10/1994 | Mather | .................. | A01G 15/00 252/194 |
| 2020/0196539 A1 | * | 6/2020 | Cardi | ...................... | F42B 12/70 |

FOREIGN PATENT DOCUMENTS

| CN | 109186372 A | * | 1/2019 |
| JP | 2001262118 A | * | 9/2001 |
| KR | 20200072015 A | * | 6/2020 |

OTHER PUBLICATIONS

Machine translation of KR-20200072015-A (Year: 2020).*
(Continued)

*Primary Examiner* — James S Bergin
(74) *Attorney, Agent, or Firm* — United One Law Group LLC; Kongsik Kim; Jhongwoo Peck

(57) ABSTRACT

Provided is a rocket for artificial rainfall using an ejection hygroscopic flare, the rocket including: a rocket body configured to descend with a parachute after flight by thrust, and having a hygroscopic flare discharge outlet; a communication module installed in the rocket body, and configured to transmit and receive a launch command and an ejection command with a ground station; an ejection hygroscopic flare installed in the rocket body and filled with cloud seeds and a burning material therein; and a hygroscopic flare ejection device configured to separate and eject the ejection hygroscopic flare from an inside of the rocket body to an outside thereof.

3 Claims, 6 Drawing Sheets

(51) Int. Cl.
    *F42B 12/50*    (2006.01)
    *F42B 4/12*     (2006.01)
    *F42B 15/10*    (2006.01)
    *F42B 12/46*    (2006.01)
(58) Field of Classification Search
    CPC .......... F42B 12/46; F42B 12/50; F42B 15/10;
                    F42B 30/00; F42B 30/08; G01W 1/08;
                                                F02K 9/96
    USPC .......................................... 239/14.1; 102/351
    See application file for complete search history.

(56) References Cited

OTHER PUBLICATIONS

Machine translation of JP-2001262118-A (Year: 2001).*
Machine translation of CN-109186372-A (Year: 2019).*
International Search Report in PCT/KR2020/014085 (Year: 2021).*

* cited by examiner

ROCKET FOR ARTIFICIAL RAINFALL USING EJECTION HYGROSCOPIC FLARE

CROSS REFERENCE TO RELATED APPLICATION

The present application claims priority to Korean Patent Application No. 10-2020-0109379, filed Aug. 28, 2020, the entire contents of which is incorporated herein for all purposes by this reference.

BACKGROUND OF THE INVENTION

1. Field of the Invention

The present disclosure relates generally to a rocket for artificial rainfall and, more particularly, to a rocket for artificial rainfall using an ejection hygroscopic flare, the rocket being capable of performing an artificial rainfall experiment by separating the hygroscopic flare in the air by an ejection method.

2. Description of the Related Art

In recent years, due to changes in the global environment, water scarcity has emerged as a serious problem all over the world. There are many cases where prolonged periods without rainfall causes drought damage, and water shortages are increasing in regions where precipitation is limited due to regional characteristics.

In view of this, attempts to artificially make rain or increase the amount of rain have been continued in recent years, and such artificial rainfall refers to a technique that artificially induces rain from clouds, or to such artificial rain.

In addition, as industrial development and technological progress lead to serious atmospheric pollution caused by pollutants released to the atmosphere, attempts of producing artificial rainfall are continuing for the purpose of solving such atmospheric pollution.

For aerial experiments to induce such artificial rainfall, an aircraft is used to spray cloud seeds in the air. In this case, it is difficult for the aircraft to approach clouds accompanied by strong precipitation or turbulence, which may cause safety problems.

In view of this, attempts to perform artificial rainfall experiments using rockets are being made. However, in the case of rockets for artificial rainfall commonly used overseas, solid rockets are mainly used. Solid propellant rockets have a risk of explosion because fuels and oxidants are already mixed therein, and thus are difficult to manufacture and handle.

The foregoing is intended merely to aid in the understanding of the background of the present disclosure, and is not intended to mean that the present disclosure falls within the purview of the related art that is already known to those skilled in the art.

Documents of Related Art

Patent document 1) Korean Patent Application Publication No. 10-2017-0036239

SUMMARY OF THE INVENTION

Accordingly, the present disclosure has been made keeping in mind the above problems occurring in the related art, and an objective of the present disclosure is to provide a rocket for artificial rainfall using an ejection hygroscopic flare, wherein the rocket is improved in structure so that the hygroscopic flare is separated from the rocket in the air to spray cloud seeds.

In order to achieve the above objective, according to one aspect of the present disclosure, there is provided a rocket for artificial rainfall using an ejection hygroscopic flare, the rocket including: a rocket body configured to descend with a parachute after flight by thrust, and having a hygroscopic flare discharge outlet; a communication module installed in the rocket body, and configured to transmit and receive a launch command and an ejection command with a ground station; an ejection hygroscopic flare installed in the rocket body and filled with cloud seeds and a burning material therein; and a hygroscopic flare ejection device configured to separate and eject the ejection hygroscopic flare from an inside of the rocket body to an outside thereof.

Therefore, when the rocket reaches a desired altitude, the ejection hygroscopic flare may be separated and ejected from the rocket to eject cloud seeds.

Here, the ejection hygroscopic flare may include: a cylindrical hygroscopic flare body with an open end; and a cover coupled to the open end of the hygroscopic flare body, wherein a plurality of discharge holes may be formed along an outer circumference of the hygroscopic flare body.

In addition, the hygroscopic flare body may include a main chamber and an extension chamber connected to the main chamber, wherein the main chamber may include a bottom portion, a cylindrical outer portion connected to the bottom portion, and a coupling flange extended from an end of the outer portion and connected and coupled to the extension chamber; and the extension chamber may have a cylindrical structure, with opposite ends from each of which a coupling flange is extended.

According to the rocket for artificial rainfall using the ejection hygroscopic flare according to the present disclosure, it is possible to control the flight altitude of the hygroscopic flare by controlling the amount of an oxidant, which makes it possible to respond to various cloud layers, and the hygroscopic flare is ejected at a desired altitude to spray the cloud seeds, which makes it possible to intensively spray the cloud seeds into a cloud layer that is efficient for artificial rainfall.

In addition, it is possible to control the descent speed of the hygroscopic flare by controlling the size of a parachute mounted on the hygroscopic flare, and thus, there is an advantage of controlling the spray time and spray concentration of the cloud seeds.

In addition, the structure of the ejection hygroscopic flare allows the capacity to be easily controlled as necessary, which makes it possible to control the spray amount and spray time of the cloud seeds as necessary.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Figure 1:
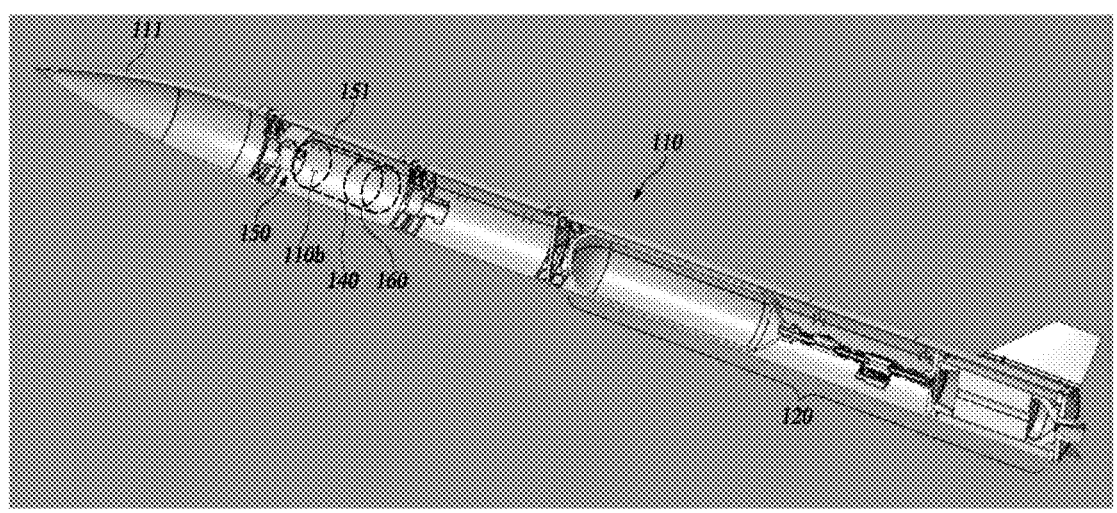
FIG. 1 is a schematic configuration view illustrating a rocket for artificial rainfall using an ejection hygroscopic flare according to an embodiment of the present disclosure.
Figure 2:
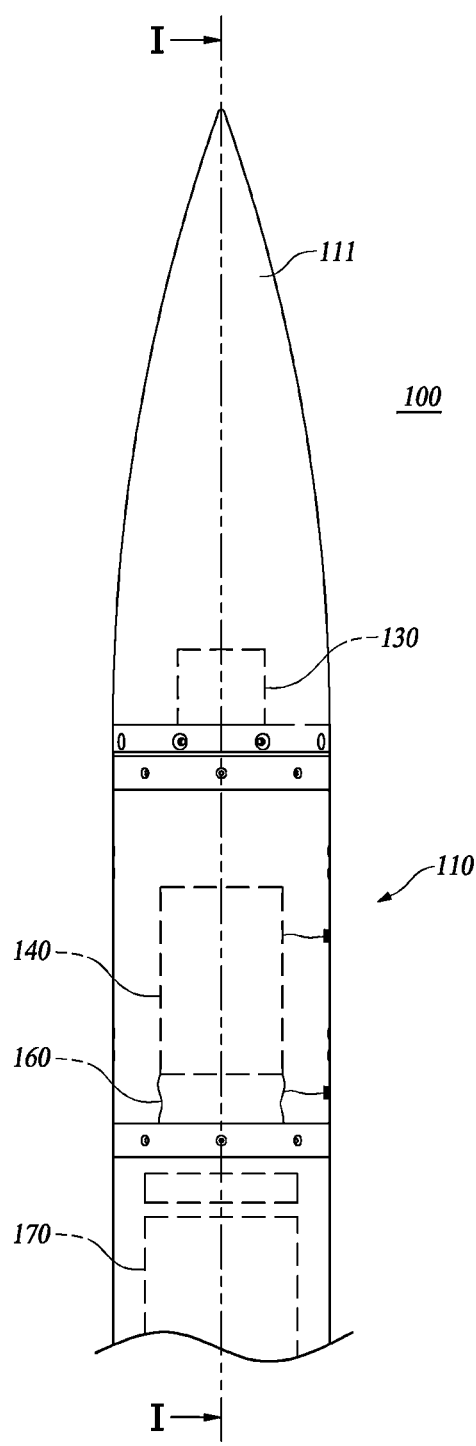
FIG. 2 is a schematic view illustrating a main part of FIG. 1.
Figure 3:
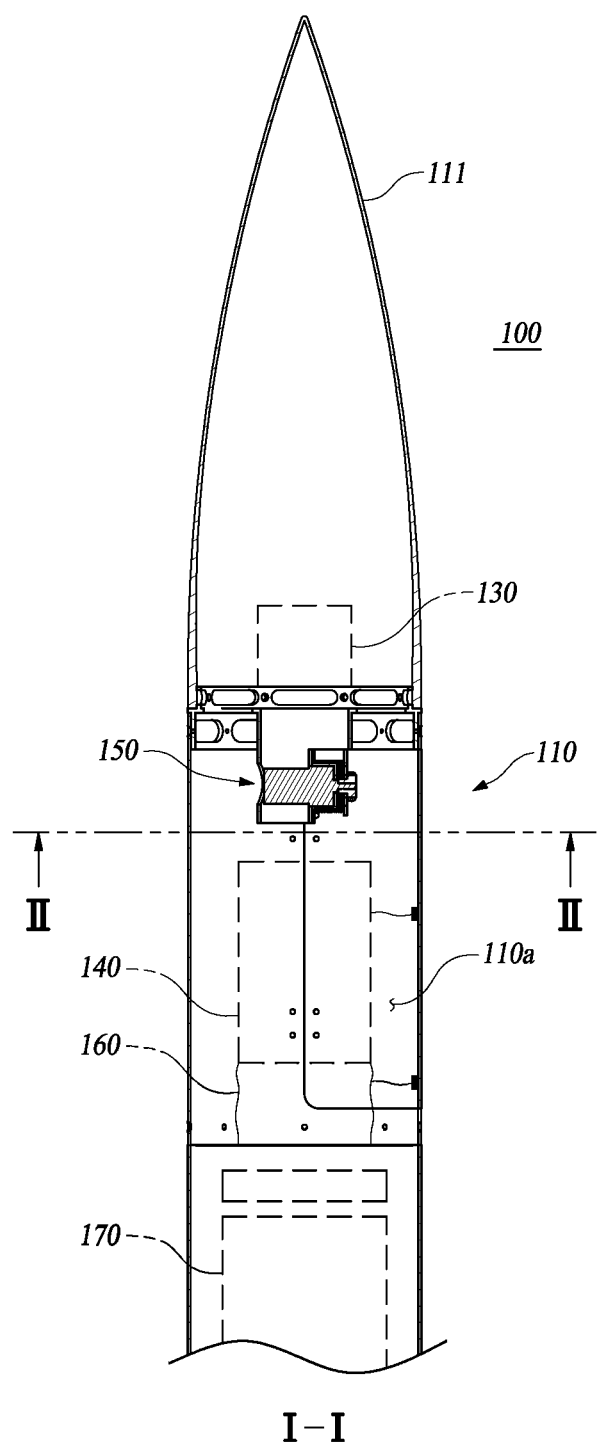
FIG. 3 is a sectional view taken along line I-I of FIG. 2.
Figure 4:
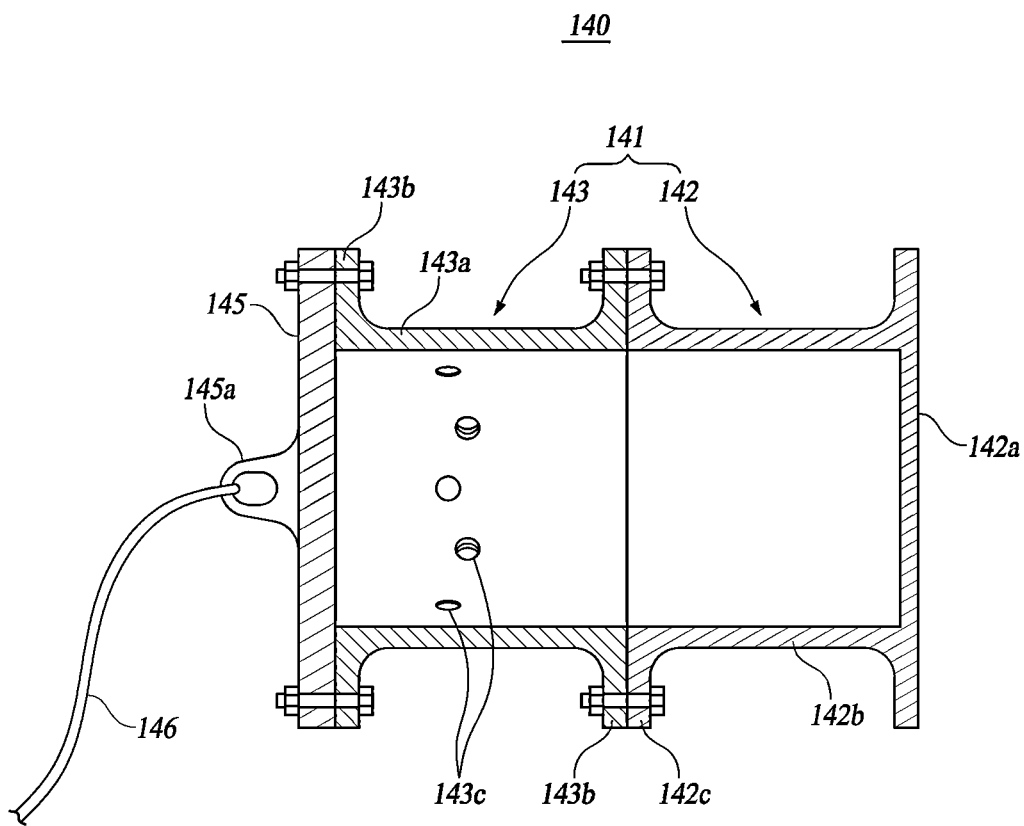
FIG. 4 is a sectional view illustrating the ejection hygroscopic flare illustrated in FIG. 3.
Figure 5:
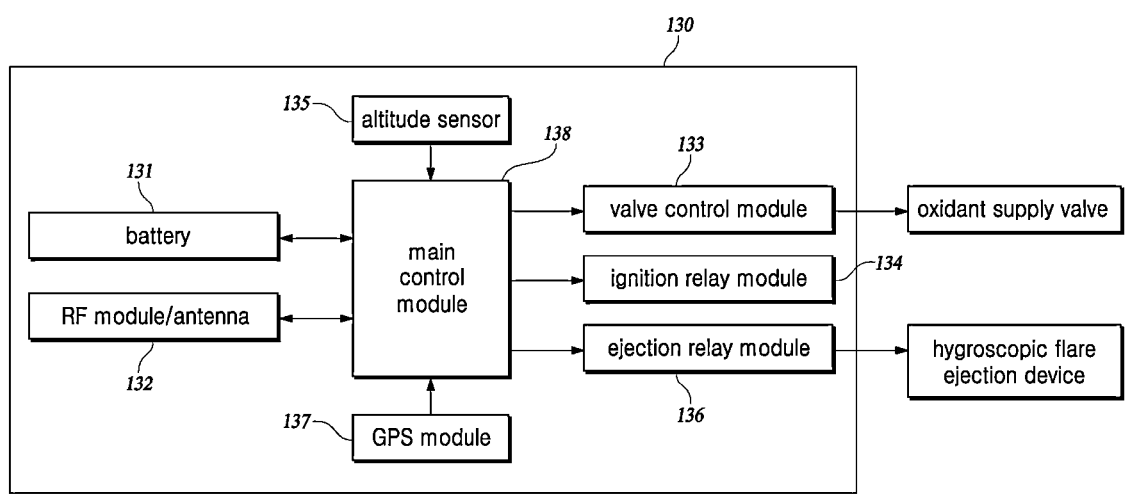
FIG. 5 is a block diagram illustrating a communication module.

Hereinbelow, a rocket for artificial rainfall using an ejection hygroscopic flare according to an embodiment of the present disclosure will be described in detail with reference to the accompanying drawings.

Referring to FIGS. 1 to 6, the rocket 100 for artificial rainfall using the ejection hygroscopic flare 140 according to the embodiment of the present disclosure includes a rocket body 110, a rocket motor 120 installed in the rocket body 110 to generate thrust of the rocket 100, a communication module 130 for transmitting and receiving communication with a ground station, a rocket recovery parachute 170 for recovery of the rocket 100, the ejection hygroscopic flare 140 for spraying cloud seeds, and a hygroscopic flare ejection device 150 for separating and ejecting the ejection hygroscopic flare from the rocket body 110.

The rocket body 110 has a vertically long cylindrical structure, with a top end to which a nose cone 111 is coupled. The rocket body 110 may be configured such that a rocket propulsion device that provides thrust from the bottom, i.e., the rocket motor 120, the rocket recovery parachute 170, the ejection hygroscopic flare 140, and the communication module 130 are sequentially received therein. A hygroscopic flare receiving part 110*a* in which the ejection hygroscopic flare 140 is received has a hygroscopic flare discharge outlet 110*b* for allowing ejection of the hygroscopic flare 140.

An outlet cover 151 is coupled to the hygroscopic flare discharge outlet 110*b* to cover the outside of the hygroscopic flare discharge outlet 110*b*. Preferably, the outlet cover 151 is intimately coupled to the outside of the rocket body 110 by a plurality of magnets to maintain a state of covering the hygroscopic flare discharge outlet 110*b*.

The rocket motor 120 may include a fuel capable of generating thrust while burning during ignition and a combustion chamber, and a solid fuel may be used. In this case, an oxidant tank is installed above the combustion chamber and the solid fuel, and during an ignition operation, an oxidant of the oxidant tank is supplied to the combustion chamber to ignite the solid fuel in the combustion chamber to obtain thrust. The specific configuration of the rocket motor 120 having this configuration is not intended to limit the present disclosure, and various known techniques can be used, and thus a detailed description thereof will be omitted.

The communication module 130 includes a battery 131 for power supply, an RF module/antenna 132 for communication with a ground station, a valve control module 133 for controlling an oxidant supply valve, an ignition relay module 134 for transmitting an ignition signal of an igniter of the rocket motor 120, an altitude sensor 135 for altitude measurement, an ejection relay module 136 for controlling the hygroscopic flare ejection device 150, a GPS module 137 for tracking a flight trajectory of the rocket 100, and a main control module 138.

The ejection hygroscopic flare 140 has a chamber structure filled with cloud seeds therein, and is connected to a hygroscopic flare parachute 160 by a rope or the like. In addition, the ejection hygroscopic flare 140 may include a hygroscopic flare igniter (not illustrated) for igniting the cloud seeds, and a GPS module for tracking a descending trajectory of the ejection hygroscopic flare 140. The hygroscopic flare igniter may be set to automatically ignite when the ejection hygroscopic flare 140 is separated from the rocket body 110. For example, the ejection hygroscopic flare 140 may include a detection switch (sensor) that detects a separation state of the ejection hygroscopic flare 140 from the rocket body 110, and an ignition operation of the hygroscopic flare igniter may be performed according to a detection signal of the detection switch.

In detail, the ejection hygroscopic flare 140 includes a hygroscopic flare body 141, and a cover 145 coupled to an inlet of the hygroscopic flare body 141. The hygroscopic flare body 141 may include a main chamber 142, and an extension chamber 143 connected to the main chamber 142. The main chamber 142 has a bottom portion 142*a*, and a cylindrical outer portion 142*b* connected to the bottom portion 142*a*. A coupling flange 142*c* for connection coupling with the extension chamber 143 is extended from an end of the outer portion 142*b*. The extension chamber 143 has a cylindrical structure, with opposite ends from each of which a coupling flange 143*b* is extended. The extension chamber 143 may be connected and coupled to the main chamber 142 by a fastening member, so that an inner space of the ejection hygroscopic flare 140 is expanded. The extension chamber 143 has a plurality of discharge holes 143*c* formed along the circumferential direction. By controlling the number and size of the discharge holes 143*c*, it is possible to control the injection time, i.e., the burning time, of the cloud seeds in the ejection hygroscopic flare 140. The cover 145 is coupled to the respective coupling flanges 143*b* of the extension chamber 143. A ring 145*a* is formed on the cover 145, and a rope 146 to which the hygroscopic flare parachute 160 is connected is connected to the ring 145*a*.

An altitude sensor, a GPS, etc., not illustrated, may be installed on the cover 145.

The hygroscopic flare ejection device 150 forcibly separates and ejects the ejection hygroscopic flare 140.

Hereinbelow, the effect of the rocket 100 for artificial rainfall using the ejection hygroscopic flare 140 according to the embodiment of the present disclosure having the above configuration will be described in detail.

Figure 6:
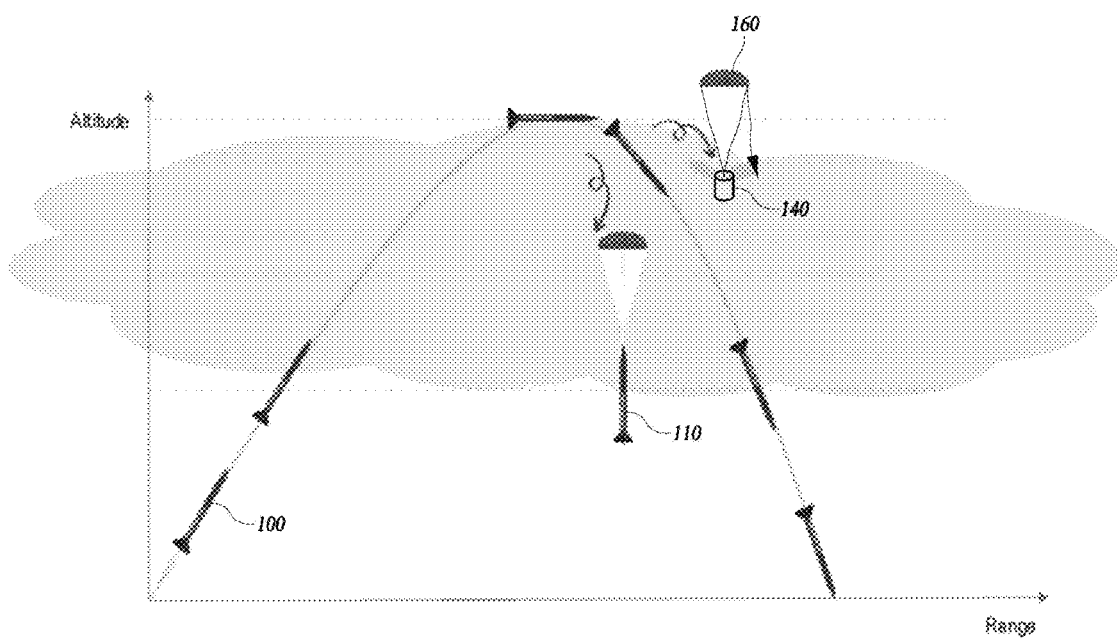
FIG. 6 is a schematic view illustrating a usage example the rocket for artificial rainfall using the ejection hygroscopic flare according to the embodiment of the present disclosure.

First, after launching the rocket 100 from the ground using a launch device, when the rocket 100 flies and reaches a peak altitude, or reaches a desired altitude, the main control module 138 check this and operates the ejection device 150 to eject the ejection hygroscopic flare 140. That is, the main control module 138 ignites the ejection hygroscopic flare 140 to separate and eject the ejection hygroscopic flare 140 from the rocket body 110. Then, as illustrated in FIG. 6, the ejection hygroscopic flare 140 is separated and ejected with the hygroscopic flare parachute 160 connected and sprays the cloud seeds while descending. Of course, the ejection hygroscopic flare 140 may be configured to spray the cloud seeds while descending in free fall without being connected to a parachute.

As described above, according to the present disclosure, by controlling the amount of the oxidant mounted in the rocket 100 and a launch angle, it is possible for the rocket 100 to fly in a desired trajectory, and by ejecting the ejection hygroscopic flare 140 at an appropriate altitude, it is possible to spray the cloud seeds into a cloud layer that is effective for artificial rainfall.

In addition, by controlling the size of the hygroscopic flare parachute 160 mounted on the ejection hygroscopic flare 140, it is possible to control a descent speed of the ejection hygroscopic flare 140.

Here, the ejection hygroscopic flare 140 is composed of the cloud seeds and a burning material, and the spraying of the cloud seeds takes place through combustion of the burning material. Similar to a kind of solid propellant, the burning material has a characteristic that the burning rate is opposite to the ambient pressure. Therefore, by controlling the size of the outlet of the ejection hygroscopic flare 140, it is possible to control the burning rate of the burning material, thereby controlling the spray rate of the cloud seeds. That is, by controlling the number of extension chamber 143 of the ejection hygroscopic flare 140, it is possible to control the amount of the cloud seeds, burning time, etc.

In addition, it is possible to set the ejection device 150 to operate at an altitude or a peak altitude previously input to the main control module 138, an altitude set by a ground station, or the like.

As described above, the present disclosure has been illustrated and described in conjunction with a preferred embodiment for illustrating the principle of the present disclosure, but the present disclosure is not limited to the configuration and operation illustrated and described as such. Rather, it will be well understood by those skilled in the art that various modifications, additions and substitutions are possible, without departing from the scope and spirit of the present disclosure as disclosed in the accompanying claims.

What is claimed is:

1. A rocket for artificial rainfall using an ejection hygroscopic flare, the rocket comprising:

a rocket body configured to descend with a parachute after flight by thrust, and having a hygroscopic flare discharge outlet;

a communication module installed in the rocket body, and configured to transmit and receive a launch command and an ejection command with a ground station;

an ejection hygroscopic flare installed in the rocket body and filled with cloud seeds and a burning material therein; and a hygroscopic flare ejection device configured to separate and eject the ejection hygroscopic flare from an inside of the rocket body to an outside thereof.

2. The rocket of claim 1, wherein the ejection hygroscopic flare comprises:

a cylindrical hygroscopic flare body with an open end; and a cover coupled to the open end of the hygroscopic flare body, wherein a plurality of discharge holes are formed along an outer circumference of the hygroscopic flare body.

3. The rocket of claim 2, wherein the hygroscopic flare body comprises a main chamber and an extension chamber connected to the main chamber, wherein the main chamber comprises a bottom portion, a cylindrical outer portion connected to the bottom portion, and a coupling flange extended from an end of the outer portion and connected and coupled to the extension chamber; and wherein the extension chamber has a cylindrical structure, with opposite ends from each of which a coupling flange is extended.

* * * * *